United States Patent
Nakamura

(10) Patent No.: US 10,016,915 B2
(45) Date of Patent: Jul. 10, 2018

(54) RUBBER STRIP MANUFACTURING APPARATUS

(71) Applicant: SUMITOMO RUBBER INDUSTRIES, LTD., Kobe-shi, Hyogo (JP)

(72) Inventor: Yoshinobu Nakamura, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 85 days.

(21) Appl. No.: 15/105,471

(22) PCT Filed: Nov. 14, 2014

(86) PCT No.: PCT/JP2014/080185
§ 371 (c)(1),
(2) Date: Jun. 16, 2016

(87) PCT Pub. No.: WO2015/093200
PCT Pub. Date: Jun. 25, 2015

(65) Prior Publication Data
US 2016/0318218 A1 Nov. 3, 2016

(30) Foreign Application Priority Data
Dec. 17, 2013 (JP) .................. 2013-260542

(51) Int. Cl.
*B29C 43/52* (2006.01)
*B29C 47/00* (2006.01)
(Continued)

(52) U.S. Cl.
CPC .............. *B29C 43/52* (2013.01); *B29C 43/46* (2013.01); *B29C 47/0004* (2013.01);
(Continued)

(58) Field of Classification Search
CPC .... B29C 43/46; B29C 2043/461; B29C 43/52
See application file for complete search history.

(56) References Cited

U.S. PATENT DOCUMENTS 5,257,965 A * 11/1993 Fuchs ................. D21F 3/08
492/40
2004/0071812 A1* 4/2004 Tsuji .................. B29O 43/46
425/509
(Continued)

FOREIGN PATENT DOCUMENTS

EP 1862289 A2 12/2007
EP 2532505 A1 12/2012
(Continued)

OTHER PUBLICATIONS

Extended European Search Report for European Application No. 14871616.0, dated Jul. 31, 2017.
(Continued)

*Primary Examiner* — Timothy Kennedy
(74) *Attorney, Agent, or Firm* — Birch, Stewart, Kolasch & Birch, LLP

(57) ABSTRACT

To provide an apparatus for manufacturing a rubber strip in which damages such as cracks occurring in ceramic outer layers of calender rolls can be suppressed, and which is capable of rolling the rubber strip continuously for a long period of time.
[Solution] It is an apparatus 1 for manufacturing a rubber strip having a rubber extruder 2 having a discharge port 2a for continuously discharging the rubber, and a pair of upper and lower calender rolls 3, 3 for rolling the rubber discharged from the discharge port 2a to form a rubber strip G. Each of the calender rolls 3 includes a roll main body 7 which is driven to rotate, and a cylindrical outer layer 8 which is concentrically disposed on the outside of the roll main body 7 to roll the rubber by its outer peripheral surface
(Continued)

8S. The outer layer 8 is made of a ceramic. Between the outer layer 8 and the roll main body 7, a gap P is provided. In the gap P, an O-ring 10 for rotating the outer layer 8 integrally with the roll main body 7 is inserted.

6 Claims, 5 Drawing Sheets

(51) Int. Cl.
*B29C 47/08* (2006.01)
*B29C 43/46* (2006.01)
*B29C 47/88* (2006.01)
*F16C 13/00* (2006.01)
*B29K 21/00* (2006.01)
*B29L 7/00* (2006.01)

(52) U.S. Cl.
CPC ........ *B29C 47/004* (2013.01); *B29C 47/0014* (2013.01); *B29C 47/0808* (2013.01); *B29C 47/8805* (2013.01); *F16C 13/00* (2013.01); *B29C 47/0019* (2013.01); *B29C 47/8845* (2013.01); *B29K 2021/00* (2013.01); *B29K 2909/02* (2013.01); *B29L 2007/007* (2013.01)

(56) References Cited

U.S. PATENT DOCUMENTS

| | | | |
|---|---|---|---|
| 2004/0157035 A1* | 8/2004 | Guizzetti | ................. B32B 5/18 |
| | | | 428/66.6 |
| 2009/0297777 A1 | 12/2009 | Sano et al. | |
| 2010/0065675 A1 | 3/2010 | Taft et al. | |

FOREIGN PATENT DOCUMENTS

| | | |
|---|---|---|
| EP | 2220293 B1 | 10/2013 |
| JP | 3-37410 A | 2/1991 |
| JP | 2009184152 A * | 8/2009 |
| JP | 2011-194737 A | 10/2011 |
| WO | WO 2013/183492 A1 | 12/2013 |

OTHER PUBLICATIONS

International Search Report for PCT/JP2014/080185 (PCT/ISA/210) dated Feb. 3, 2015.
Written Opinion of the International Searching Authority for PCT/JP2014/080185 (PCT/ISA)237) dated Feb. 3, 2015.

* cited by examiner

RUBBER STRIP MANUFACTURING APPARATUS

TECHNICAL FIELD

The present invention relates to a apparatus for manufacturing a rubber strip including a pair of upper and lower calender rolls for rolling rubber to form a rubber strip.

BACKGROUND ART

There has been proposed a manufacturing apparatus comprising a rubber extruder for continuously discharging rubber, and a pair of upper and lower calender rolls for rolling the discharged rubber in order to manufacture an unvulcanized rubber strip. (see, the following Patent Document 1 for example) Each of the calender rolls has a roll main body which is driven to rotate, and a cylindrical outer layer fixed to the outside thereof. The roll main body is made of a metal, whereas the outer layer is made of a ceramic. Such outer layer has an advantage such that unvulcanized rubber is hardly adhered thereto as compared with those made of metals.

Patent Document 1: Japanese unexamined Patent Publication No. 2011-194737

DISCLOSURE OF THE INVENTION

Problems to be Solved by the Invention

In the case of the calender rolls described above, when rolling the rubber discharged from the rubber extruder, the heat of the rubber is transferred through the outer layer. The heated outer layer and roll main body are respectively thermally expanded despite the respective thermal expansion coefficients are significantly different. Specifically, the thermal expansion coefficient of the roll main body made of a metal is larger than the thermal expansion coefficient of the outer layer made of a ceramic. Therefore, the largely-expanded roll main body presses the inside of the outer layer, and there is a possibility to cause damages such as cracks on the outer layer.

In view of the circumstances described above, the present invention was made, and a primary object is to provide an apparatus for manufacturing a rubber strip, in which damages such as cracks occurring in the outer layers of the calender rolls can be suppressed, and it is possible to roll the rubber strip continuously for a long period of time.

Means for Solving the Problems

The present invention is an apparatus for manufacturing a rubber strip, having a rubber extruder having a discharge port for continuously discharging the rubber, and a pair of upper and lower calender rolls for rolling the rubber discharged from the discharge port to form a rubber strip, and characterized in that each of the calender rolls includes a roll main body which is driven to rotate, and a cylindrical outer layer which is concentrically disposed outside the roll main body to roll the rubber by the outer peripheral surface thereof, the outer layer is made of a ceramic, a gap is provided between the outer layer and the roll main body, and an O-ring is inserted in the gap for rotating the outer layer integrally with the roll main body.

In the apparatus for manufacturing a rubber strip according to the present invention, it is preferable that the roll main body includes an inner layer portion, and a middle layer disposed outside the inner layer portion, at least one of the inner layer portion and the middle layer is provided with a circumferential groove in which a fluid for changing the temperature of the middle layer is flowed, and a pair of the O-rings are inserted on both sides of the groove in the axial direction of the calender roll to prevent leakage of the fluid.

In the apparatus for manufacturing a rubber strip according to the present invention, it is preferable that the maximum diameter of the cross section of the O-ring is in a range of 3.0 mm-6.0 mm.

Effects of the Invention

The apparatus for manufacturing a rubber strip according to the present invention is provided with the rubber extruder and a pair of the upper and lower calender rolls. Each of the calender rolls includes the roll main body which is driven to rotate, and the cylindrical outer layer concentrically disposed outside of the roll main body to roll the rubber by its outer peripheral surface. The outer layer is formed by a ceramic. Such outer layer may easily separate from the rubber strip rolled by its outer peripheral surface.

Further, in the calender roll of the manufacturing apparatus according to the present invention, the gap is provided between the outer layer and the roll main body. In the gap, there are inserted the O-rings for rotating the outer layer integrally with the roll main body. Owing to such gap and O-rings, the contact between the roll main body and the outer layer caused by the thermal expansion of the roll main body, and the pressure on the outer layer of the roll main body are suppressed. Moreover, by the rotation of the roll main body, the outer layer may also be driven to rotate through the O-rings. Therefore, in the apparatus for manufacturing a rubber strip according to the present invention, damage such as cracks occurring in the outer layer made of ceramic can be suppressed, and it is possible to roll a rubber strip continuously for a long period of time.

Figure 1:
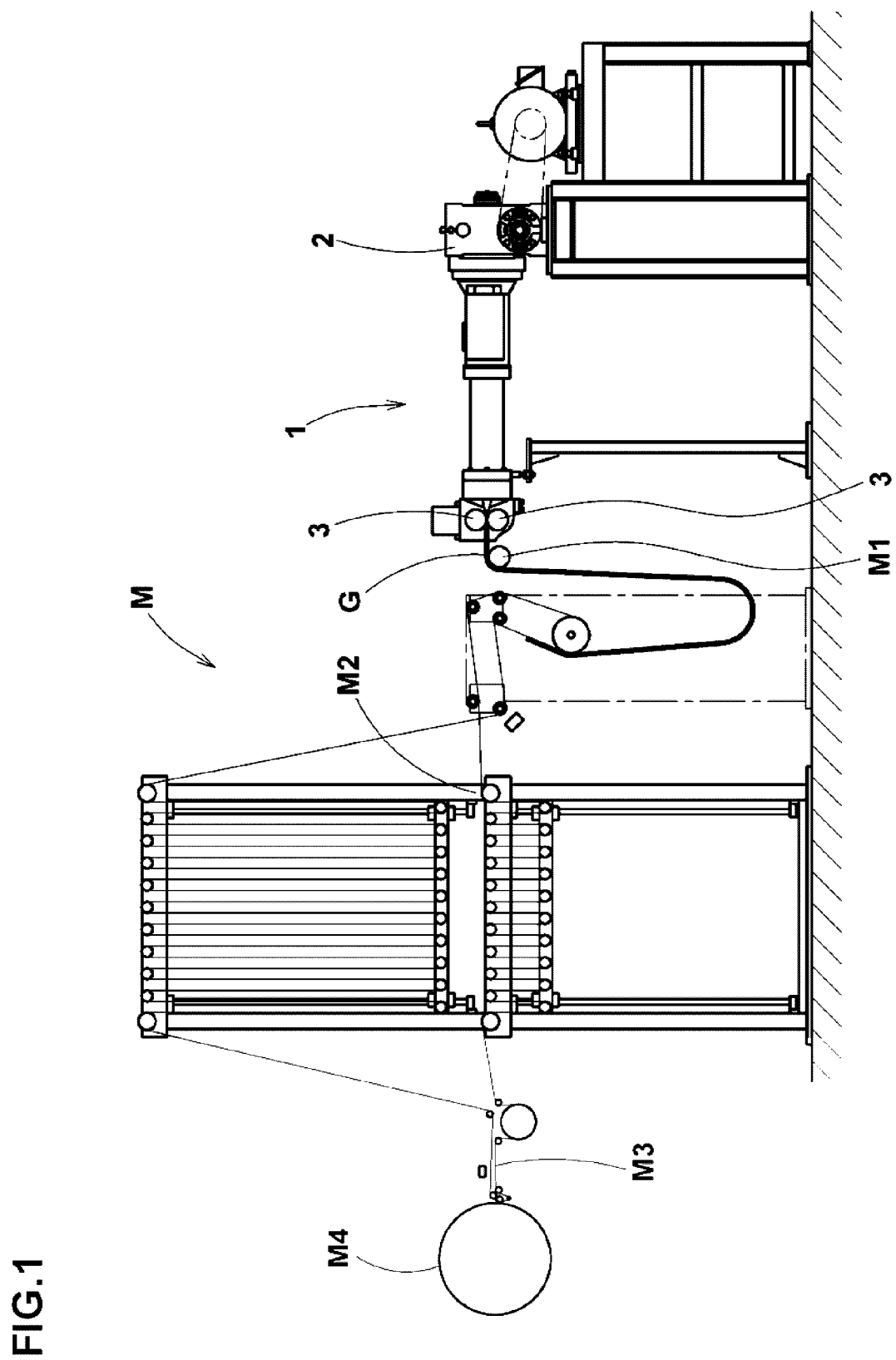
FIG. 1 A side view of an apparatus for manufacturing a rubber strip as an embodiment of the present invention.

DESCRIPTION OF THE REFERENCE CHARACTERS 1 apparatus for manufacturing a rubber strip
2 rubber extruder
2a discharge port
3 calender roll
7 roll main body
8 outer layer
8S outer peripheral surface
O-ring
G rubber strip
I gap

BEST MODE FOR CARRYING OUT THE INVENTION

Hereinafter, an embodiment of the present invention will be described with reference to the accompanying drawings.

In FIG. 1, there is shown a side view of an apparatus for manufacturing a rubber strip in the present embodiment (hereinafter, sometimes simply described as "manufacturing apparatus") 1. As shown in FIG. 1, the manufacturing apparatus 1 is provided with a rubber extruder 2 for continuously discharging rubber, and a pair of upper and lower calendar rolls 3, 3 for rolling the rubber discharged from the rubber extruder 2 to form a rubber strip G.

The manufacturing apparatus 1 in this embodiment can be suitably employed in, for example, a green tire manufacturing apparatus M for shaping a rubber strip G for making a tire. The green tire manufacturing apparatus M is, for example, provided with a pickup roll M1 for picking up the rubber strip G from the calendar roll 3, an accumulating means M2 for temporarily accumulating the rubber strip G on the downstream side of the pickup roll M1, a supply means M3 for supplying the rubber strip G from the accumulating means M2, and, a tire building drum M4 around which the rubber strip G supplied from the supply means M3 is wound.

Figure 2:
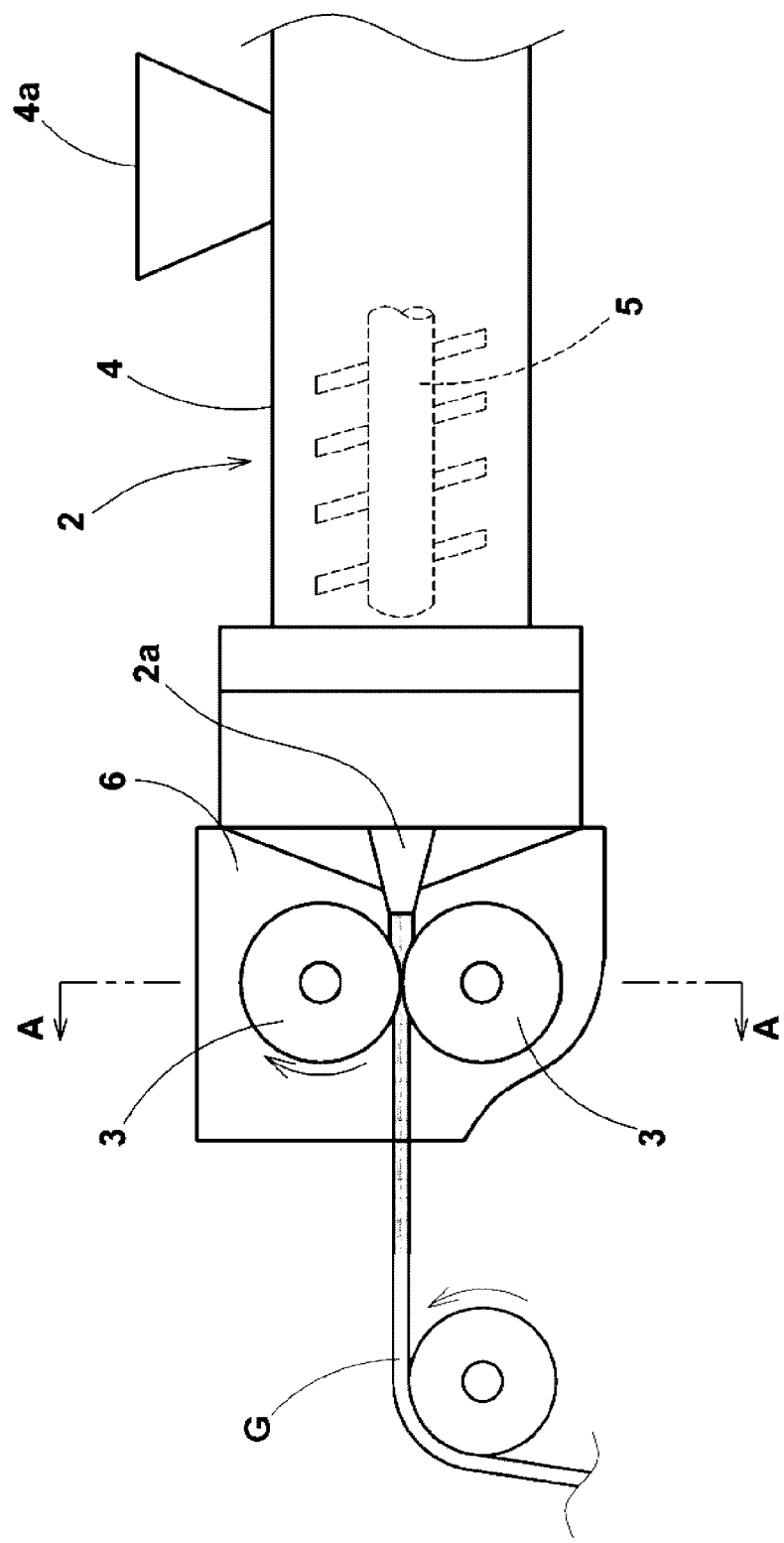
FIG. 2 A closeup of a part of FIG. 1 in the vicinity of the calender rolls.

In FIG. 2, there is shown a closeup of a part of FIG. 1 in the vicinity of the calender rolls 3. As shown in FIG. 2, the rubber extruder 2 in the present embodiment includes a cylinder 4 provided with a rubber inlet 4a, and a screw shaft 5 disposed in the cylinder 4. In the rubber extruder 2 in the present embodiment, the rubber put in the rubber inlet 4a is pushed ahead with the screw shaft 5 while being plasticized. Thereby, the rubber is continuously extruded from a discharge port 2a of the rubber extruder 2.

The discharge port 2a of the rubber extruder 2 is, for example, formed by a predetermined opening. It is preferable that this opening is formed on an extrusion head which is interchangeably mounted on the forefront side (downstream side) of the rubber extruder 2. Since the rubber flow is controlled by such discharge port 2a, the rubber discharged may be preformed into a desired cross-sectional shape.

At the forefront side of the rubber extruder 2 in the present embodiment, there is attached a roller holder 6 for pivotally supporting a pair of the calender rolls 3, 3. Between a pair of the calender rolls 3, 3, a gap is provided. The rubber discharged from the discharge port 2a is passed through the gap between the calender rolls 3,3, and is rolled into the rubber strip G having a final cross-sectional shape.

Figure 3:
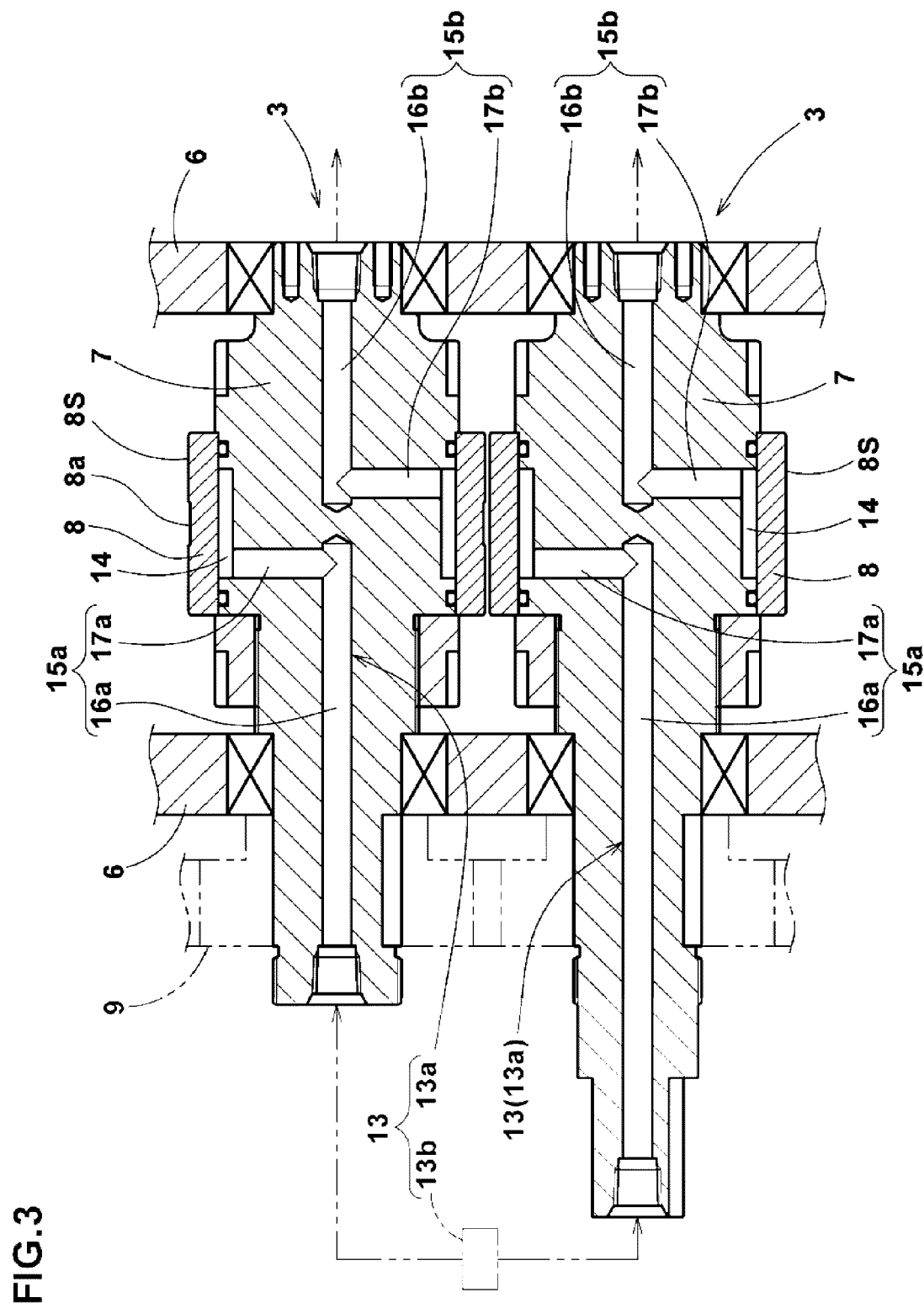
FIG. 3 A-A cross-sectional view of FIG. 2.

In FIG. 3, there is shown the A-A sectional view of FIG. 2. As shown in FIG. 3, each of the calender rolls 3 includes a roll main body 7 driven to rotate, and a cylindrical outer layer 8 concentrically disposed outside the roll main body 7. The outer layer 8 is driven to rotate together with the roll main body 7.

The roll main body 7 in the present embodiment is formed as a shaft. The roll main body 7 is formed from a metal whose material is, for example, carbon steel such as SCM. The both ends of the roll main body 7 are rotatably supported by the roller holders 6, 6, respectively. Each of the roll main bodies 7, 7 is coupled to a drive means (not shown), for example, via a linking mechanism 9 such as gear. Thereby, a pair of the calender rolls 3, 3 can be rotated, for example, at the same speed and in the opposite directions.

The outer layer 8 is made of a ceramic. The outer layer 8 has an outer peripheral surface 8S for rolling the rubber discharged from the rubber extruder 2. The ceramics have low tackiness to the unvulcanized rubber as compared to metals for example. Therefore, the outer layer 8 can easily separate from the rubber strip G rolled by the outer peripheral surface 8S.

As the ceramic forming the outer layer 8 of this embodiment, alumina-based fine ceramics comprising at least 75% of alumina ($Al_2O_3$) are preferably used. Owing to such outer layer 8, the rubber strip G can be more easily separated. In order to more effectively derive this effect, it is preferred that the ceramic forming the outer layer 8 contains at least 90%, more preferably at least 98% alumina.

It is preferable that the outer peripheral surface 8S of the outer layer 8 is, for example, satin finished to have a surface roughness of 1.00 micrometers to 1.50 micrometers. It is preferable that the outer peripheral surface 8S of the outer layer 8 of one of the calender rolls 3 is provided with a guide groove 8a for rolling a rubber, which guide groove is formed along the circumferential direction of the calender roll 3. Owing to such peripheral surface 8S, the rubber strip G can be more easily separated.

It is preferable that the thickness of the outer layer 8 is, for example, set in a range of 6.0 mm to 10.0 mm. If the thickness of the outer layer 8 is less than 6.0 mm, there is a possibility that, by the pressure during rolling the rubber, the outer layer 8 is damaged at an early stage. If the thickness of the outer layer 8 is more than 10.0 mm, there is a possibility that the weight of the calender rolls 3 increases. Further, there is a possibility that the heat transferred from the rubber during rolling the rubber can not be effectively discharged.

Figure 4:
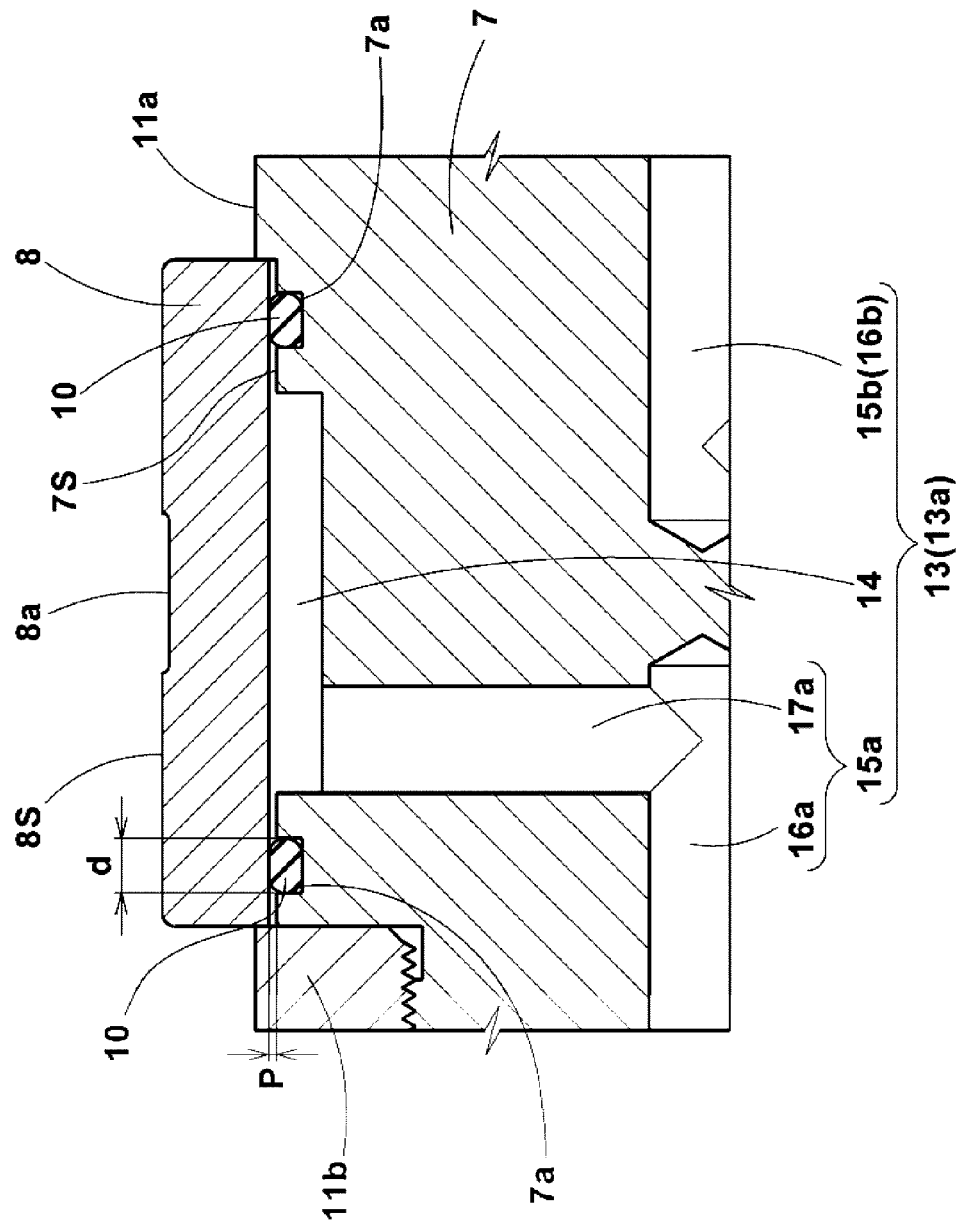
FIG. 4 A closeup of a part of FIG. 3 in the vicinity of the outer peripheral surface of the outer layer.

In FIG. 4, there is shown a closeup of a part of FIG. 3 in the vicinity of the outer peripheral surface 8S of the outer layer 8. As shown in FIG. 4, between the outer layer 8 and the roll main body 7, a circumferentially continuous gap P is formed. In this gap P, there is inserted an O-ring 10 for rotating the outer layer 8 together with the roll main body 7. The O-ring 10 in the present embodiment is inserted in a compressed state in the gap P.

In the present embodiment, when rolling the rubber discharged from the rubber extruder 2, the heat of the rubber is transferred from the outer layer 8 to the calender roll 3. By the heat transferred from the rubber, the roll main body 7 and the outer layer 8 are heated to thermally expand. The thermal expansion coefficient of the roll main body 7 made of a metal is larger than the thermal expansion coefficient of the outer layer 8 made of a ceramic. In the calender rolls 3 in the present embodiment, the gap P between the roll main body 7 and the outer layer 8 can prevent contact between the roll main body 7 and the outer layer 8 due to large thermal expansion of the roll main body 7, and suppress the pressure on the outer layer 8 of the roll main body 7. Moreover, owing to the frictional force of the O-ring 10 inserted in a compressed state in the gap P, the outer layer 8 is rotated by rotating the roll main body 7. In the manufacturing apparatus 1 in the present embodiment, therefore, damage such as cracks occurring in the outer layer 8 is suppressed, and the rubber strip G can be rolled continuously for a long period of time.

It is preferable that the gap P is, for example, in a range of 0.02 mm to 0.05 mm. If the gap P is less than 0.02 mm, the pressure of the roll main body 7 on the outer layer 8 is not sufficiently suppressed, and there is a possibility that the outer layer 8 is damaged at an early stage. If the gap P is more than 0.05 mm, looseness of the O-ring 10 is increased, and there is a possibility that the roll main body 7 and the outer layer 8 may not be held together. Thereby, when rolling the rubber, there is a possibility that looseness occurs between the roll main body 7 and the outer layer 8, and the shaping accuracy of the rubber strip G is reduced.

In the gap P in the present embodiment, a pair of the O-rings 10, 10 are inserted at a distance from each other in the axial direction of the calender roll 3. The O-rings 10 are fitted into respective holding grooves 7a provided on the outer peripheral surface 7S of the roll main body 7. Such holding groove 7a can prevent displacement of the O-ring 10. In order to effectively hold the roll main body 7 and the outer layer 8 as a single unit, it is preferable that the O-ring 10 is made of rubber for example.

For example, the maximum diameter d of the cross section of the O-ring 10 is preferably 3.0 mm or more, and preferably 6.0 mm or less, more preferably 4.0 mm or less. If the maximum diameter d of the O-ring 10 is less than 3.0 mm, then the contact surface between the O-ring 10 and the outer layer 8 and the contact surface between the O-ring 10 and the roll main body 7 become decreased, and there is a possibility that it becomes difficult to rotate the outer layer 8 and the roll main body 7 integrally. If the maximum diameter d of the O-ring 10 is more than 6.0 mm, the elastic deformation of the O-ring 10 is increased, and there is a possibility that backlash in the roll main body 7 and the outer layer 8 occurs easily, and the shaping accuracy of the rubber strip G is decreased by the backlash.

In the present embodiment, in order to reduce the backlash of the roll main body 7 and the outer layer 8, for example, the roll main body 7 is provided with a pair of flange portions 11a, 11b. The flange portion 11a is arranged on one side in the axial direction of the roll main body 7. The flange portion 11b is arranged on the other side in the axial direction of the roll main body 7. The flange portion lib in the present embodiment is provided detachably by being screwed to the roll main body 7. Further, in this embodiment, the flange portions 11a, 11b and the outer layer 8 are arranged to close contact with each other in the axial direction of the roll main body 7. The displacement of the outer layer 8 in the axial direction of the roll main body 7, can be prevented by the flange portions 11a, 11b.

As shown in FIG. 3 or FIG. 4, the calender rolls 3 in the present embodiment includes a temperature control means 13. The temperature control means 13 is intended for adjusting the temperature of the outer layer 8, preferably that of the outer peripheral surface 8S of the outer layer 8. The temperature control means 13 includes, for example, a flow path 13a through which cold water (or warm water) flows, and a supply unit 13b for supplying the cold water (or hot water) to the flow path 13a.

Hereinafter, the description of the present embodiment is made based on that the cold water is supplied to the flow path 13a. The temperature of the cold water may be set around 25 degrees C. for example, but it is desirable to be pre-cooled to in a range of 5 degrees C. to 10 degrees C.

The flow channel 13a in the present embodiment includes a circumferential groove 14, a first conductive hole 15a, and a second conductive hole 15b. The circumferential groove 14 is provided in the outer peripheral surface 7S of the roll main body 7, and extends continuously in the circumferential direction. The first conductive hole 15a is extended from one end of the roll main body 7, and connected to the circumferential groove 14. The second conductive hole 15b is extended from the other end of the roll main body 7, and connected to the circumferential groove 14.

In the present embodiment, the circumferential groove 14 is sealed by the O-rings 10, 10 disposed on the both sides of the circumferential groove 14. Thereby, the flow channel 13a is shut off from the outside of the calender roll 3, and leakage of the cold water can be prevented.

Each conductive hole 15a, 15b in the present embodiment is, for example, provided with a lateral hole 16a, 16b extending on the axis of the roll main body 7, and a longitudinal hole 17a, 17b extending radially from the lateral hole 16a, 16b to the circumferential groove 14, respectively. It is preferable that the longitudinal hole 17a of the first conductive hole 15a is formed at a different position in the circumferential direction of the roll main body 7 than the longitudinal hole 17b of the second conductive hole 15b.

In the temperature control means 13 in the present embodiment, for example, the cold water supplied to the first conductive hole 15a is discharged from the second conductive hole 15b via the circumferential groove 14. At this time, since the cold water flowing through the circumferential groove 14 contacts with the outer layer 8, the outer peripheral surface 8S of the outer layer 8 can be effectively cooled.

Figure 5:
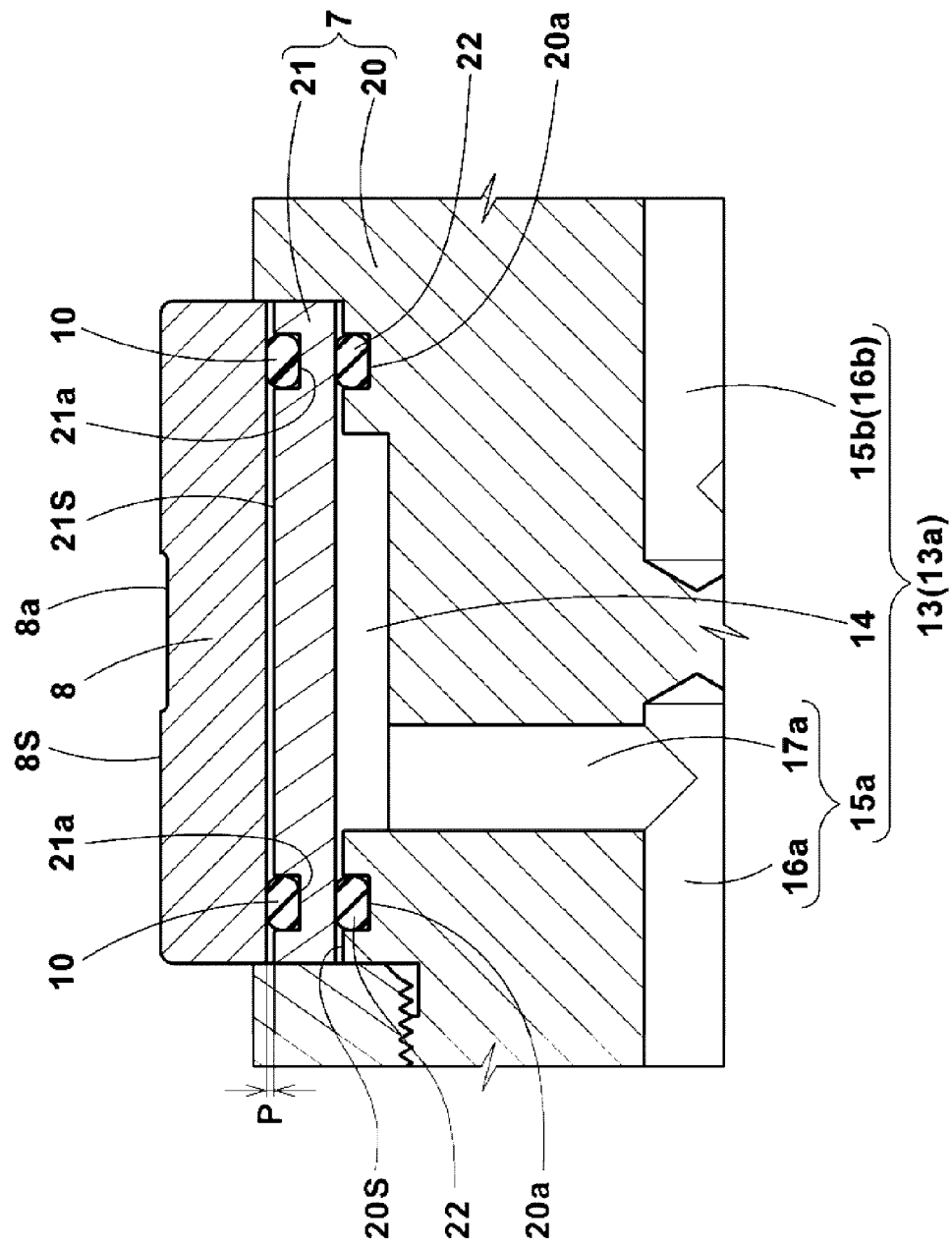
FIG. 5 An enlarged sectional view of the vicinity of the outer peripheral surface of the outer layer in another embodiment of the present invention.

In FIG. 5, there is shown an enlarged partial view of the vicinity of the outer peripheral surface 8S of the outer layer 8 in another embodiment of the present invention. The roll main body 7 of the embodiment shown in FIG. 5 includes an inner layer portion 20 formed as a shaft body, and a cylindrical middle layer 21 disposed outside the inner layer portion 20.

Similarly to the roll main body 7 of the embodiment shown in FIG. 3, the inner layer portion 20 is rotatably supported by the roller holders 6, 6 and connected to the linking mechanism 9. The outer peripheral surface 20S of the inner layer portion 20 is provided with a pair of mounting grooves 20a, 20a in which a pair of O-rings 22, 22 are fitted respectively.

The middle layer 21 is arranged concentrically with the inner layer portion 20 on the outside of the inner layer portion 20. Between the middle layer 21 and the inner layer portion 20, a gap is formed. By the gap, thermal expansion of the inner layer portion 20 is absorbed. Therefore, adverse effects on the outer layer 8 due to thermal expansion of the inner layer portion 20 may be suppressed.

By the O-rings 22, 22 inserted in the respectively mounting grooves 20a, 20a of the inner layer portion 20, the middle layer 21 and the inner layer portion 20 are held to be rotatable together. The outer peripheral surface 21S of the middle layer 21 is provided with a pair of mounting grooves 21a, 21a in which a pair of O-rings 10, 10 are fitted respectively.

The outer layer 8 of the embodiment shown in FIG. 5 is arranged concentrically with the inner layer portion 20 on the outside of the middle layer 21. Between the outer layer 8 and the middle layer 21, a gap P is formed. By a pair of the O-rings 10, 10 inserted in a pair of the mounting grooves 21a, 21a of the middle layer 21, the outer layer 8 and the middle layer 21 are held to be rotatable together. In the calender roll 3 in this embodiment, owing to the gap P between the outer layer 8 and the middle layer 21, the contact between the middle layer 21 and the outer layer 8 due to the thermal expansion of the middle layer 21, and the pressure on the outer layer 8 of the middle layer 21 can be suppressed. Therefore, damage such as cracks occurring in the outer layer 8 is prevented, and the rubber strip G can be continuously rolled for a long period of time. Moreover, even if the outer layer 8 is bent by a large pressure acting during rolling the rubber, as the flexed outer layer 8 is supported by the middle layer 21, damage of the outer layer 8 can be effectively suppressed.

In the temperature control means 13 in the embodiment shown in FIG. 5, the circumferential groove 14 of the flow channel 13a is disposed in the outer peripheral surface 20S of the inner layer portion 20. The circumferential groove 14 is formed by a groove extending in the circumferential direction between a pair of the mounting grooves 20a, 20a.

In this embodiment, the circumferential groove 14 is sealed by the O-rings 10, 10 disposed on the inner circumferential surface of the middle layer 21 and on both sides of the circumferential groove 14.

In the calender rolls 3 of the embodiment shown in FIG. 5, even if damage such as cracks penetrating the outer layer 8 occurs, there is no possibility that the cold water flowing through the flow channel 13a leaks from the outer peripheral surface 8S of the outer layer 8. Therefore, the influence of the rubber strip G by getting wet can be suppressed.

While detailed description has been made of especially preferable embodiments of the present invention, the present invention can be embodied in various forms without being limited to the illustrated embodiments.

The invention claimed is:

1. An apparatus for manufacturing a rubber strip, comprising:
    a rubber extruder having a discharge port for continuously discharging the rubber, and
    a pair of upper and lower calender rolls for rolling the rubber discharged from the discharge port to form a rubber strip,
    wherein each of the calender rolls includes a roll main body which is driven to rotate, and a cylindrical outer layer which is concentrically disposed on the outside of the roll main body to roll the rubber by its outer peripheral surface,
    the outer layer is made of a ceramic,
    the roll main body comprising an inner layer portion and a middle layer disposed outside of the inner layer portion,
    a first gap is circumferentially and continually provided between the outer layer and the middle layer of the roll main body,
    a first O-ring is inserted in the first gap for rotating the outer layer integrally with the roll main body,
    a second gap is circumferentially and continually provided between the middle layer and the inner layer portion of the roll main body,
    a pair of second O-rings are inserted in the second gap for rotating the middle layer integrally with the inner layer portion,
    at least one of the inner layer portion and the middle layer is provided with a circumferential groove in which a fluid for changing the temperature of the middle layer flows, and
    the pair of second O-rings are disposed on both sides of the circumferential groove in the axial direction of the calender roll to prevent leakage of the fluid.

2. The apparatus for manufacturing a rubber strip as set forth in claim 1, wherein
    the inner layer portion is provided with the circumferential groove in which a fluid for changing the temperature of the middle layer is flowed.

3. The apparatus for manufacturing a rubber strip as set forth in claim 1, wherein the maximum diameter of a cross section of the O-ring is in a range of 3.0 mm to 6.0 mm.

4. The apparatus for manufacturing a rubber strip as set forth in claim 2, wherein the circumferential groove opens to the inner circumferential surface of the middle layer so that the fluid contacts therewith.

5. The apparatus for manufacturing a rubber strip as set forth in claim 4, wherein the first gap extends over the inner circumferential surface of the ceramic outer layer in the axial direction.

6. The apparatus for manufacturing a rubber strip as set forth in claim 5, wherein the outer peripheral surface of the ceramic outer layer is provided with a guide groove for rolling the rubber.

* * * * *